Jan. 20, 1959 E. D. WILKERSON 2,870,242
CONDUIT PROTECTING SHEATH
Filed May 13, 1954
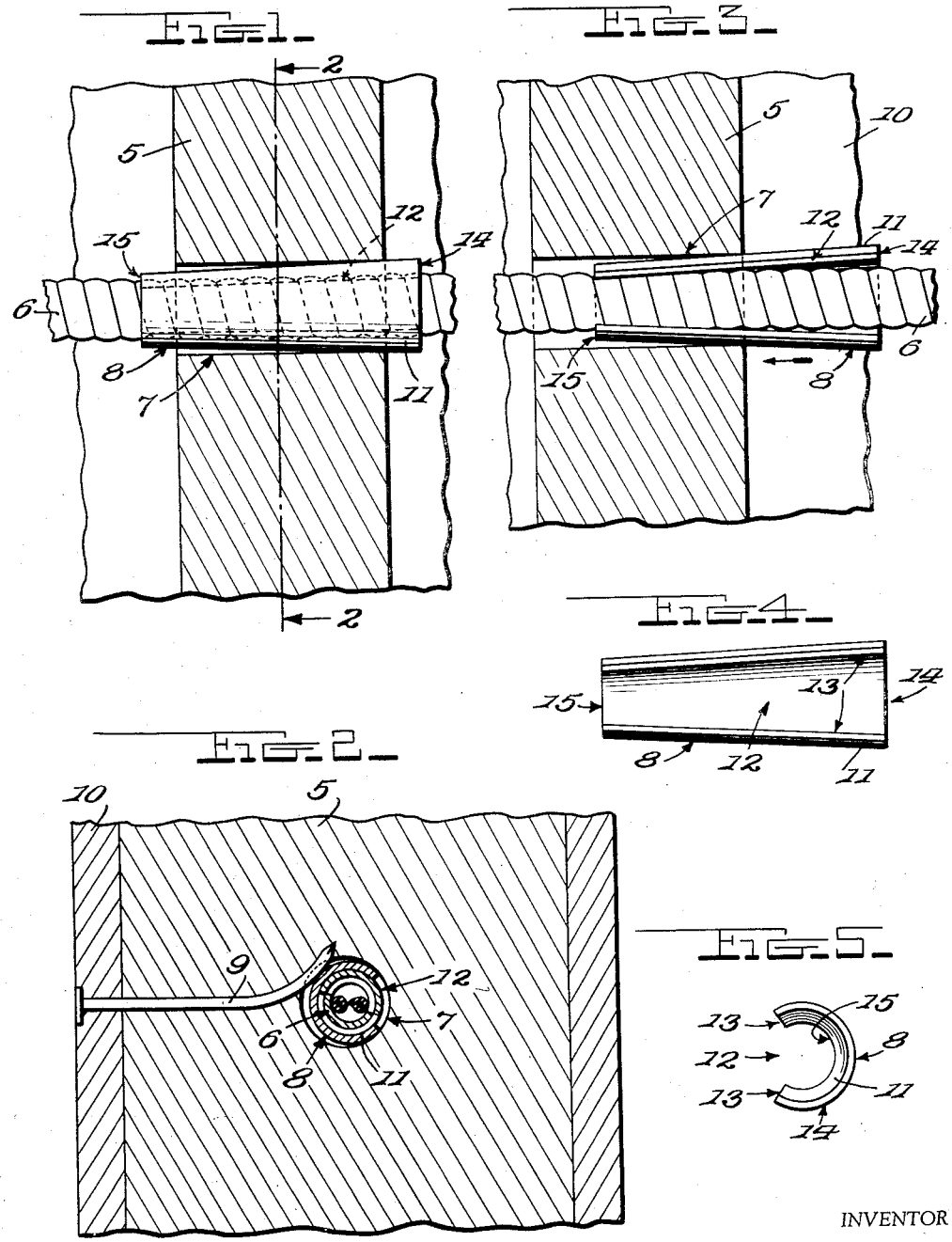
INVENTOR
Edward W. Wilkerson
BY
ATTORNEYS

2,870,242

CONDUIT PROTECTING SHEATH

Edward D. Wilkerson, Orange, N. J.

Application May 13, 1954, Serial No. 429,496

3 Claims. (Cl. 174—135)

The invention relates generally to conduit protecting devices and primarily seeks to provide a novel metal protecting sheath mountable over conduits such as water pipes, electrical conductors or the like where they pass through wall studding, thereby to protect them from driven nails which otherwise might impale the conduits and cause leaks or short circuits.

In the initial construction or remodeling of buildings it is quite common to drill holes in the wall studding and thread armored electrical conductors through the holes to the desired destinations called for in the wiring plans. Copper water pipes also are at times installed in like manner. When the walls are completed by application of proper facings, or during other finishing or trimming operations nails are commonly driven into the studding, and it sometimes happens that nails will be directed into the stud bores through which the conduits are threaded and into or through the conduits therein. This impaling, when of electrical conduits will result in short circuiting and possible starting of fires, and when of water pipes will cause leakage of water. In the case of water pipes the damage is less likely to be immediately apparent because the impaling nail may seal the puncture. However, rust and corrosion ultimately will cause leakage within the closed structure and an expensive repair job will be required. It is an object of the present invention to provide a novel protective sheath readily applicable to conduits installed in the manner stated and which will prevent the objectionable impaling of the conduits by driven nails.

In its more detailed nature the invention resides in providing a protective sleeve of the character stated which is formed of metal hard enough to turn a nail and of a diameter for surrounding a conduit where it passes through a bore in a wall stud so that a nail cannot be driven through the stud and into its bore and partially or wholly through the conduit passing therethrough.

Another object of the invention is to provide a protective sleeve of the character stated which has a longitudinal slit through one side thereof which will permit lateral mounting of the sleeve on the conduit without end threading, and then endwise movement of the sleeve along the conduit and into a stud bore through which the conduit is threaded.

A further object of the invention is to provide a protective sleeve of the character stated wherein the longitudinal slit is defined by diverging edges so as to provide a greater slit width at one end of the sleeve than at the other end.

A still further object of the invention is to provide a protective sleeve of the character stated which is formed of cold rolled steel and which is case hardened.

With the above and other objects in view that will hereinafter appear, the invention will be more clearly understood by following the detailed description, the appended claims and the several views illustrated in the accompanying drawings.

In the drawings:

Figure 1 is a vertical longitudinal sectional view showing a conduit threaded through a wall stud bore and surrounded by my improved protective sheath in said bore.

Figure 2 is a vertical cross section illustrating the parts shown in Figure 1, a driven nail being shown as having been diverted by the sheath.

Figure 3 is a view similar to Figure 1 but looking from the reverse side and showing a protective sleeve as having been applied laterally over the conduit and in the process of being moved along the conduit and into the receiving bore in the stud.

Figure 4 is a side view of the protective sleeve per se, looking toward the side slit therein.

Figure 5 is an end elevation of the sleeve shown in Figure 4 looking toward the larger diameter end.

In the example illustration of the invention made in the accompanying drawing the protective sleeve is shown as applied on a conduit in the form of an electrical conductor, but it is to be understood that the same can be applied in like manner to water pipes or other conduits. In the example illustration a wall stud is indicated at 5 and the conventional armored electrical conductor or cable 6 is shown as threaded through a bore 7 formed horizontally through the stud. The protecting sheath generally designated 8 is illustrated in Figures 1 and 2 as embracing the conductor 6 within the stud bore 7 and in position for turning a nail 9 driven into the stud through applied facing or trim means 10.

The protecting sheath shown in detail in Figures 4 and 5 preferably comprises a cold rolled and case hardened steel sleeve 11 having a side opening or slit 12 extending from end to end thereof along one side and defined by diverging edges 13 in the manner clearly illustrated in Figure 4. This manner of defining the conductor receiving opening in the sleeve provides a larger opening at the end 14 thereof than is provided at the smaller end 15. This manner of forming the conductor receiving opening is preferred because it greatly facilitates lateral insertion of the conductor by starting the same into the wide end of the slit or opening and progressively snapping the same through the small or constricted end, and this manner of mounting entirely eliminates the necessity of threading the cable through the sleeve and permits the sleeve to be readily mounted on cables or conductors which have previously been threaded through the bores 7 in the studs 5.

After a sleeve 11 has been thus applied on a conductor 6 threaded through a stud bore 7 the sleeve may be moved along the conductor to cause its small diameter end 15 to enter the receiving bore 7 in the manner clearly illustrated in Figure 3. It is now a simple matter to force the tapered sleeve into the bore so as to enclose and protect the conductor in the manner clearly illustrated in Figures 1 and 2. It is to be understood that in the final setting or mounting of each protecting sleeve the same will be disposed with its unbroken side presented for contact with any nail which may be driven into the stud. Thus any nail driven into the stud in a position which would cause it to enter the bore 7 and impale the conductor therein will be intercepted by the sleeve 11 and diverted in the manner clearly illustrated in Figure 2.

The tapering of the protecting sleeve 11 as indicated in Figures 3 and 4 not only provides for a facilitating of the insertion of the sleeve endwise into the receiving bore 7, but it also serves to accentuate the position retaining frictional contact of the sleeve in the bore when it is fully applied as indicated in Figure 1. Also, should it be desired to provide protecting sleeve means presented for engagement by nails driven into either face of a stud, a second sleeve may be mounted on a conductor and driven into a first mounted sleeve thereon so that both sleeves will surround and protect the conductor in a given bore. In such a use of the device the openings or longitudinal slits 12 in the protecting sleeves will be oppositely directed, that is, one toward one outer face of the stud and the other to the opposite outer face of the stud.

While a specific example illustration of the protecting sleeve and its mounting is disclosed herein it is to be understood that variations in the structure and mounting of the device may be made without departing from the spirit and scope of the invention as defined in the appended claims.

I claim:

1. The combination of a wall having a bore therethrough and an electrical conductor extending through said bore, and a hard metal sheath capable of turning away a nail driven thereagainst and surrounding the conductor in the bore to prevent the driving of nails into said conductor, said sheath comprising a tubular sleeve having an inside diameter large enough to embrace the conductor and an outside diameter for engaging with retaining friction in said bore, and said sleeve also having a side opening extending full length thereof through which the conductor is laterally mountable prior to insertion of the sleeve in the bore and also being resilient and self retaining in said bore.

2. The combination defined in claim 1 wherein the sleeve is formed of cold rolled steel and is tapered from end to end thereof to facilitate insertion and retention thereof in the bore.

3. The combination defined in claim 1 wherein the sleeve side opening is wider at one end than at the other end of the sleeve so as to be defined by diverging edges and provide a taper on the sleeve from end to end thereof facilitating insertion and retention of the sleeve in the bore.

References Cited in the file of this patent

UNITED STATES PATENTS

| | | |
|---|---|---|
| 408,336 | Breed | Aug. 6, 1889 |
| 1,759,043 | Derby | May 20, 1930 |
| 1,829,512 | Frederickson | Oct. 27, 1931 |
| 2,034,928 | St. John | Mar. 24, 1936 |
| 2,092,270 | Anderson | Sept. 7, 1937 |
| 2,258,745 | Dewey et al. | Oct. 14, 1941 |